United States Patent [19]

Edwards

[11] 3,755,210

[45] Aug. 28, 1973

[54] CELLULAR POLYMERIC MATERIALS

[75] Inventor: Alfred Gerald Edwards, Stourport-on-Severn, England

[73] Assignee: Albright & Wilson Limited, Warwickshire, England

[22] Filed: Mar. 10, 1972

[21] Appl. No.: 233,730

[30] Foreign Application Priority Data
Mar. 26, 1971 Great Britain...................... 7,891/71

[52] U.S. Cl........... 260/2.5 F, 260/2.5 R, 260/47 R, 260/51 R, 260/51.5, 260/53 R, 260/838
[51] Int. Cl.......................... C08g 5/18, C08g 53/08
[58] Field of Search......................... 260/2.5 R, 47 R

[56] References Cited
UNITED STATES PATENTS
3,576,788   4/1971   Harris et al. ...................... 260/47 R Primary Examiner—John C. Bleutge
Assistant Examiner—Morton Foelak
Attorney—Herbert H. Goodman

[57] ABSTRACT

Known polymeric materials can be made by the reaction of a compound of the formula $R'[-CH_2OR]_a$ or $R''[CH_2X]_a$ where $R'$ and $R''$ are di or trivalent aromatic hydrocarbon or hydrocarbon ether radicals, R is $C_{1-6}$ alkyl and X is Cl, Br or I and $a$ is 2 or 3 with a phenolic compound. Such polymers can be cured by reaction with hexamethylene tetramine.

If the polymeric compound used comprises both phenol and $\beta$ naphthol, a cellular polymer may be obtained on curing.

Such cellular polymers may be used for example in high strength light weight load bearing structures.

19 Claims, No Drawings

CELLULAR POLYMERIC MATERIALS

This invention relates to the preparation of polymeric materials having a cellular structure.

In British Patent Specification No. 1,150,203 there is described a method for the preparation of polymeric materials in which there are reacted together (1) an aralkyl ether and/or an aralkyl halide and (2) a phenolic compound. Examples of phenolic compounds which are specifically referred to in the said specification are phenol, p-cresol, meta and para-phenylphenol; resorcinol catechol iso propyl catechol, diphenylolpropane, diphenylolmethane, alkyl phenols such as p-ethyl phenol, p tert butyl phenol p tert octyl phenol, p amino phenol, pyrogallol and phlorogucinol. The products obtained employing such phenols can be cured with the aid of a novolac curing agent to provide a solid resin structure e.g., a moulded component, a laminate or an electrically insulating coating.

It has now been unexpectedly found that when an aralkyl ether and/or an aralkyl halide is reacted with a phenolic compound which comprises both phenol itself and beta-naphthol the resinous product may be cured to provide a resin having a cellular structure.

Accordingly, this invention provides a process for the preparation of a polymeric material which comprises reacting (1) an aralkyl ether of the general formula R′[—CH$_2$OR)]$_a$ and/or an aralkyl halide of the general formula R″[—CH$_2$X]$_a$ wherein R′ and R″ are divalent or trivalent aromatic hydrocarbon or hydrocarbon ether radicals and optionally contain inert substituents in the aromatic nucleus. R is an alkyl radical containing less than 6 carbon atoms, X is chlorine, bromine or iodine and $a$ has a value of 2 or 3, with (2) a molar excess of a phenolic compound which comprises both phenol and beta-naphthol.

The invention also includes polymers whenever prepared by the said process.

In the general formula of the aralkyl ether and the aralkyl halide R′ and R″ may represent any divalent or trivalent aromatic hydrocarbon or hydrocarbon ether radical, for example the phenylene radical, the diphenylene radical, the diphenylene oxide radical, the radical or the radical

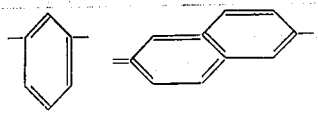

The radical R in the general formula for the aralkyl ether represents an alkyl radical having less than 6 and preferably less than 4 carbon atoms and X represents Cl, Br or I and is preferably chlorine.

If desired the R′ and R″ radicals may contain substituents for example, methyl radicals, attached to the aromatic nucleus provided the said substituents are inert under the conditions of the reaction. In fact the presence of chlorine or fluorine atoms in some or all of the available positions in the aromatic nucleus has been found advantageous in that it leads to improved flame resistance in the resulting polymeric products. Examples of substituted aralkyl ethers and aralkyl halides which may be employed according to this invention are 2,3,5,6-tetrachloro- 1,4-di(methoxymethyl)-benzene and 2,3,5,6,-tetrachloro-1,4-di-(chloromethyl) benzene. One which is commonly employed is para xylylene glycol dimethyl ether.

When prepared comercially this compound may be obtained in combination with other related compounds, for example compounds such as

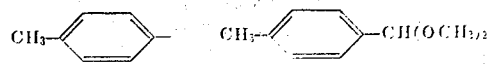

and

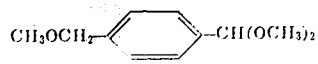

The presence of such related products can be tolerated in amounts of up to about 30 per cent by weight or more of the aralkyl ether provided the molar proportion of the aralkyl ether itself is such as to provide for the specified ratio of 1.3:1 to 2.5:1.

The phenolic compound (2) used in the process of this invention comprises both phenol itself and beta-naphthol. Preferably the phenolic compound (2) comprises from about 5 to 60 preferably from 20 to 40 per cent by weight of beta-naphtol and from 40 to 95 per cent by weight of phenol.

The phenolic compound (2) should be employed in a molar excess over the aralkyl ether and/or aralkyl halide. As the molar proportion of reactant (1) approaches that of the phenolic compound (2) the reaction mixture exhibits an increased tendency to gel prematurely. In general we prefer to employ from 1.3 to 2.0 moles of the phenolic compound per mole of aralkyl ether or halide.

In carrying out the reaction between (1) and (2) the phenol and the beta-naphthol may be incorporated separately into the reaction mixture or as a performed mixture of the two. As described in Specification No. 1,150,203 the reaction is preferably carried out in the presence of a catalyst, for example an acid clay or a Friedel Crafts catalyst such as stannic chloride, zinc chloride or ferric chloride. Other catalysts which are operative include sulphuric acid, diethyl sulphate, cupric sulphate, cupric chloride and mercuric sulphate, the preferred catalysts being cupric sulphate and diethyl sulphate.

The quantity of catalyst employed is not critical and from about 0.01 to about 1 per cent by weight based on the weight of (1) and (2) is sufficient for most purposes although up to 3 per cent or more may be used if desired. In order to expedite the reaction, particularly when (1) is an aralkyl ether, the reactants are preferably heated to a temperature in the range from about 130° to 200° C. The time required for the reaction will depend on such variables as the nature of the reactants, the type and proportion of the catalysts and the reaction temperature. Preferably the reaction is carried to substantial completion, the alcohol or hydrogen halide formed being removed by any suitable means.

The products obtained by the reaction of (1) and (2) are generally relatively low molecular weight materials which may vary from viscous liquids to brittle solids at room temperature, They may be converted to higher molecular weight cellular resins by reaction with a conventional novolac hardening agent at elevated temperatures normally in the range of 100°–200° C in the manner described in Specification No. 1,150,203. Most preferred as the hardening agent is hexamethylene tetramine, Others which can be employed, however, include quinone, chloranil, anhydroformaldehyde aniline, and ethylene diamine formaldehyde. Up to 20 per cent or more by weight of hardening agent based on the weight of the resinous reaction product of (1) and (2) may be used. We prefer however to employ from 5 to 15 per cent by weight based on the weight of the said resinous reaction product.

If desired fillers and other additives may be incorporated into the foamable composition.

The foamed resins which are obtainable employing the process of this invention find application for example as high strength lightweight, load-bearing structures and as heat and electrical insulation.

The following example illustrates the invention. In the example the 1,3-di(methoxymethyl) benzene employed was a commercial grade and contained by weight approximately 4.8 per cent by weight of p-$CH_3 \cdot C_6H_4 \cdot CH_2OCH_3$ and approximately 3.1 per cent of p-$CH_3OCH_2 \cdot C_6H_4 \cdot CH(OCH_3)_2$. The weight of this component referred to in the example includes the weight of these associated components.

EXAMPLE

Phenol (3.9 moles, 366.6.g.), beta- naphthol (2.0 moles, 144.2 g.) and 1,3-di(methoxymethyl) benzene (4.1 moles, 681.4 g.) were placed in a reaction flask and Cu $SO_4$ $5H_2O$ (0.004 moles, 1 g.) added with stirring. The resulting mixture was heated slowly to 130°–200° C and the methanol formed during the reaction was allowed to distil out of the flask. Heating was continued until no further methanol was liberated. The product, when cool was a dark brown solid having a softening point of 115° C. This was ground to a fine powder and intimately mixed with 10 percent of w/w of hexamine.

When a sample of the powder was heated in an oven at 130° C for approximately 30 minutes it was converted to a hard intractable foamed resin of even cell structure.

A further sample of the material was placed in a mould 4 inches long, 0.5 inch wide and 0.5 inch deep between two thin glasscloth reinforced resin laminates, the laminating resin used being prepared by the reaction of phenol with 1,3-di(methoxymethyl)- benzene in a manner similar to that described above. The mould was heated to 130° C and the foam formed was allowed to expand with no constricting pressure. The resulting product was a composite comsisting of a hard resin foam sandwiched between two plane laminates.

We claim:

1. A process for the preparation of polymeric material which comprises reacting (1) an aralkyl ether of the general formula R'—(CH₂ OR) $_a$ or an aralkyl halide of the general formula R"—(CH₂X)$_a$ or mixtures thereof wherein R' and R" are divalent or trivalent aromatic hydrocarbon or hydrocarbon ether radicals, R is an alkyl radical containing up to 6 carbon atoms, X is chlorine, bromine or iodine and $a$ has a value of 2 or 3 with (2) a molar excess of a phenolic compound mixture which comprises both phenol and beta-naphthol, said beta-naphthol comprising from 5% to 60% of said phenolic reactant.

2. A process according to claim 1 wherein one of the reactants (1) is para xylylene glycol dimethyl ether or para xylylene glycol dichloride.

3. A process according to claim 1 wherein R' or R" contains halogen substituents.

4. A process according to claim 1 wherein the molar ratio of phenolic compound to aralkyl ether or aralkyl halide is in the ratio of 1.3 to 2.0:1.

5. A process according to claim 1 where beta naphthol comprises from 20 – 40 percent of said phenolic compound mixture.

6. A process according to claim 1 which is carried out in the presence of a catalyst.

7. A process according to claim 2 which is carried out in the presence of a cupric sulphate or diethyl sulphate catalyst.

8. A process according to claim 7 wherein the catalyst is present in an amount of from 0.01 to 1 per cent by weight based on the total weight of reactants.

9. A process according to claim 1 which is carried out at a temperature in the range 130° to 200° C.

10. A process for the production of cellular polymeric material which comprises heating the product obtained by the process of claim 1 with a novalac hardening agent.

11. Polymeric materials obtained by the process of claim 1.

12. Cellular polymeric materials obtained by the process of claim 10.

13. A process according to claim 2 wherein the molar ratio of phenolic compound to aralkyl ether or aralkyl halide is in the ratio of 1.3 to 2.0:1.

14. A process for the production of cellular polymeric material which comprises heating the product obtained by the process of claim 2 with hexamethylene tetramine as a novolac hardening agent.

15. A process for the production of cellular polymeric material which comprises heating the product obtained by the process of claim 2 with a novolac hardening agent.

16. A process for the production of cellular polymeric material which comprises heating the product obtained by the process of claim 4 with a novolac hardening agent.

17. A process according to claim 6 wherein the catalyst is present in an amount of from 0.01 to 1 per cent by weight based on the total weight of reactants.

18. A cellular polymeric material according to claim 12 wherein R' and R" contain constituents selected from the group consisting of chloride, fluoride and methyl.

19. A polymeric material according to claim 11 wherein R' and R" contain constituents selected from the group consisting of chloride, fluoride and methyl.

* * * * *

UNITED STATES PATENT OFFICE
CERTIFICATE OF CORRECTION

Patent No. 3,755,210    Dated August 28, 1973

Inventor(s) ALFRED GERALD EDWARDS

It is certified that error appears in the above-identified patent and that said Letters Patent are hereby corrected as shown below:

Column 1, lines 44-50, should appear as follows:

cal 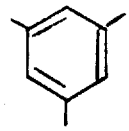   or the radical 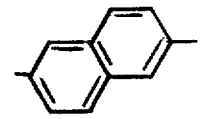

Column 2, lines 5-7, should appear as follows:

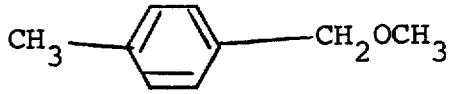   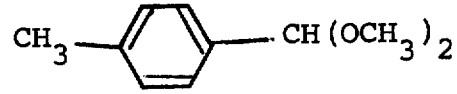

Column 2, line 23, replace "naphtol" with --naphthol--.

Column 2, line 35, replace "performed" with --preformed--.

Signed and sealed this 18th day of June 1974.

(SEAL)
Attest:

EDWARD M. FLETCHER, JR.
Attesting Officer

C. MARSHALL DANN
Commissioner of Patents